3,152,772
TRANSPORTING DEVICES
Bjørn E. Schjerven, Selvbyggerveien 18, Oslo, Norway
Filed Dec. 29, 1961, Ser. No. 163,240
Claims priority, application Norway Dec. 31, 1960
6 Claims. (Cl. 242—94)

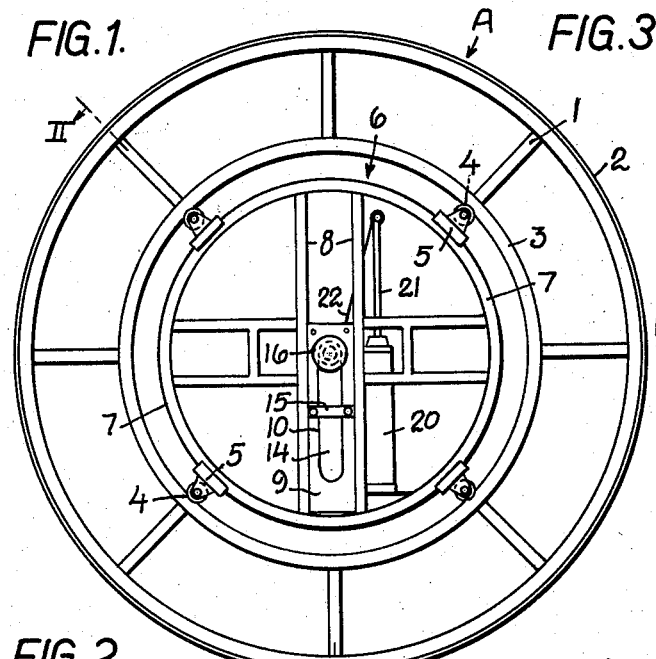

The present invention relates to transporting devices for cable drums and the like.

During transport or removal of cable drums rolling of the drums must be avoided as such rolling may cause mutual displacement of the windings so that the free end of the cable is clamped during pull-off between the windings on the drum. This may cause the cable to break. Moving a cable drum therefore usually requires cranes or other special devices unless the drum is moved on a support which requires much labor.

The object of the present invention is to provide a device by means of which a cable drum or the like may be transported either within the factory or at the place of use in a simple and easy manner.

The device consists essentially of a pair of wheels having an outer diameter greater than that of the drum to be transported, a supporting shaft extending between said wheels, two bearings rotatably connecting the ends of the shaft to respective wheels and guiding means for guiding radial movement of the bearings and of the shaft in said wheels.

For a better understanding of the present invention, reference will now be made, by way of example, to the accompanying drawing in which:

FIGURE 1 is a side view of a transporting device according to the invention,

FIGURE 2 is a sectional view taken along the line II—II in FIG. 1,

FIGURE 3 is a section view along the line III—III in FIG. 4, and

FIGURE 4 is an enlarged side view of the central part of the apparatus of FIGURE 1.

As shown in the drawing the transporting device comprises generally a pair of wheels A, A and a detachable shaft B between them. Each of the wheels has a diameter greater than that of the drum D to be transported, and includes an outer ring-shaped frame portion 1 defined outwardly by a wheel rim 2 and inwardly by a ring 3 coaxial with said rim. The ring 3 has a circular cross-section and serves as a race for a number of rolls or casters 4 rotatably mounted in brackets 5 which are evenly spaced around the circumference of a central wheel portion 6 which thereby is rotatably supported in the outer portion 1.

The central portion comprises a ring-shaped outer channel member 7 having a U-shaped cross-section. The ends of four parallel flat bars 8 are secured by welding, to the flange portions of the channel member 7. Two axially spaced flat bars 8 are positioned at each side of and at an equal distance from the axis of the member 7. The bars form two pairs in respective axially spaced radial planes, and the members of each pair are interconnected by means of a plate member 9 extending upward from the lower side of the member 7 slightly beyond the axis thereof. The plates 9 are formed with respective radial slots 10 having semi-circular end portions, and the centers of the upper or inner end portions coincide with the axis of the member 7.

The slots 10 rotatably receive a cylindrical sleeve 11 which serves as a bearing for the drum supporting shaft B. Said sleeve has an inner end portion 11′ inserted in a bushing 12 in the drum bore, and a fixed collar 13 which limits the penetration of the sleeve 11 into the drum bore and determines the distance between member 7 and drum D. In order to retain or lock the bearing sleeve in position at the upper or inner end of the slots 10, a conforming locking piece 14 is inserted in the slots below the sleeve. Said locking piece is provided with a cross piece 15 detachably secured to the outer plate member 9 by means of screws.

In transporting a drum D having lesser diameter than that of the wheels A, the wheels are positioned one at each side of the drum with the slots 10 therein extending vertically downwards from the bore of the drum. After removal of the locking pieces 14, the ends 11 of the sleeves 11 are inserted into the respective ends of the drum bore. Subsequently the supporting shaft B, which at one end has a head 16 and at the other end a threaded portion 17, is passed through the assembled drum and sleeves, and the whole assembly is clamped together axially by means of a washer 18 and nut 19 on said other end of the shaft. So far, the drum has not been moved, and its weight still is not supported by the wheels.

The shaft B, with the drum D supported thereon, which now is positioned at a distance below the axis of the wheels corresponding to the difference in radius length between wheels and drum, is now lifted to the upper or inner end of the slots 10. This may be effected by means of hydraulic jacks positioned under the ends of the shaft. The center of gravity of the drum is now in or near the axis of the wheels, and the assembled structure may be rolled away readily.

In the embodiment shown in the drawing each of the wheels is provided with a hydraulic cylinder 20 and with a piston not visible in the drawing. The piston rod 21 of the piston is connected to one end of a chain or wire 22 which is passed around the lower side of the sleeve 11 and has its other end anchored to a bolt 23 secured between the plate members 9 at a level above the upper ends of the slots 10.

The cylinders 20 are supplied with pressure fluid from a suitable source such as a conventional hand actuated pump (not shown).

When the cylinders 20 are actuated they lift the sleeves 11 supported in the bights of the chains or wires 22, together with the shaft B and the drum D thereon to the upper ends of the slots. The sleeves are locked in position by insertion of the locking pieces 14. In order to avoid clamping of the wire or chain between the sleeve 11 and the upper end of the locking piece, a groove 24 is formed in said end, as best seen in FIG. 3.

I claim:

1. A transporting device for a cable drum, comprising a pair of substantially coaxial axially spaced wheels having an outer diameter greater than that of the drum to be transported, a supporting shaft extending between said wheels, bearing means for connecting the ends of said shaft detachably and rotatably to the respective wheels and guiding means on each wheel for guiding radial movement of a respective bearing means toward and away from a position in which said bearing means is substantially coaxial with said wheels.

2. A transporting device as in claim 1, in which each of the wheels is provided with power operated means for moving the bearing means with the supporting shaft along said guiding means.

3. A transporting device for a cable drum, comprising a pair of wheels, each wheel consisting of an outer ring-shaped portion and an inner central portion rotatably supported therein, a supporting shaft extending between said wheels, bearing means for connecting each end of said shaft detachably to the central portion of a respective wheel, and guiding means on each wheel for guiding radial movement of a respective bearing means toward and away from a position in which said bearing means is substantially coaxial with said central portions.

4. A transporting device as in claim 3, in which the central portion of each wheel is provided with power operated means for moving the supporting shaft along said guiding means.

5. A transporting device as in claim 3, in which the bearing means are movable in radial slots in the respective central portions, and locking means for locking said bearing means in said portions in said positions thereof.

6. A transporting device as in claim 5, in which each bearing means includes a sleeve having a portion rotatably supported in one of said radial slots, and another portion adapted to be inserted in the bore of the drum, and a collar on said other portion for limiting insertion of said other portion in said bore.

References Cited in the file of this patent

UNITED STATES PATENTS

| | | |
|---|---|---|
| 503,277 | Brigham | Aug. 15, 1893 |
| 511,232 | Brazee | Dec. 19, 1893 |
| 1,461,939 | Sager | July 17, 1923 |
| 1,513,061 | Muth | Oct. 28, 1924 |
| 2,199,901 | Whitaker | May 7, 1940 |